Jan. 28, 1964 L. D. BARRY 3,119,988

MAGNETIC RECORDER FOR SYMBOLS

Filed Dec. 1, 1955 6 Sheets-Sheet 1

INVENTOR.

Leonard D. Barry

MAGNETIC RECORDER FOR SYMBOLS

Filed Dec. 1, 1955 6 Sheets-Sheet 2

INVENTOR.

Leonard D. Barry

INVENTOR.
Leonard D. Barry

Jan. 28, 1964 L. D. BARRY 3,119,988

MAGNETIC RECORDER FOR SYMBOLS

Filed Dec. 1, 1955 6 Sheets-Sheet 4

INVENTOR.

Leonard D. Barry

INVENTOR.

Leonard D. Barry

MAGNETIC RECORDER FOR SYMBOLS

Filed Dec. 1, 1955

6 Sheets-Sheet 6

INVENTOR.

Leonard D. Barry

United States Patent Office 3,119,988 Patented Jan. 28, 1964

3,119,988

MAGNETIC RECORDER FOR SYMBOLS

Leonard D. Barry, 19300 Pennington Drive, Detroit 21, Mich.

Filed Dec. 1, 1955, Ser. No. 550,277
23 Claims. (Cl. 340—174.1)

This invention relates to magnetic recording and reproducing and in particular to a novel type or symbol recorder and or reproducer.

It is an object to provide a keyboard magnetic recorder wherein each recording key records a distinctive amount of flux on the magnetic medium.

It is an object to provide a magnetic reproducer for alphabet letters and or numbers, signs, musical notes, functions, or the like which provides an output signal representing recorded flux (instead of rate of change of flux) and which completes a circuit to a particular reproducing device according to the value of the flux picked up.

It is a further object to provide a magnetic symbol reproducer which distributes a beam as deflected by flux picked up from the recorded medium to various reproducing circuits each for reproducing a particular symbol recorded.

It is a further object to provide a magnetic symbol recorder which does not require movement of the magnetic medium during recording and reproducing of each symbol. Such a recorder can record or reproduce at any speed to its maximum on the same and minimum amount of magnetic medium.

The preferred magnetic head for reproducing a signal according to the flux, instead of the rate of change of flux, is an electron beam tube head as disclosed in my pending patent application Serial No. 499,657, titled Magnetic Recording and Reproducing, except that in my present invention the reproducing area or target surface for the beam is composed of individual conductors one or more for reproducing each symbol and function. Various degrees of recorded flux under the reproducing head represent various symbols and operating functions and deflect a reproducing electron beam to respective target units completing a different circuit to reproduce different symbols and functions.

It is an object to provide a magnetic recording typewriter or a typerecorder for recording and for reproducing the recording on one or more automatic electric typewriters. In the preferred automatic typewriter, solenoids are used to control the type bars, escapement, shift, line-space index, and line index and carriage return.

It is an object to provide a novel magnetic recorder for recording and reproducing numbers.

It is an object to provide variations of the recorder for recording on either a magnetic sheet, roll or drum.

It is an object to provide means to magnetically erase a single recorded symbol so that another symbol can be recorded in its place without removing the medium from the recording head.

Various other features and objects will be described herein or should be apparent to those skilled in the art upon consideration of the following description with reference to the accompanying drawings wherein:

FIGURE 1 is a perspective view of one form of my typerecorder with an automatic typewriter electrically connected thereto.

FIGURE 2 perspectively illustrates the preferred type bar actuating means for the automatic typewriter of FIGURE 1.

Figure 8:
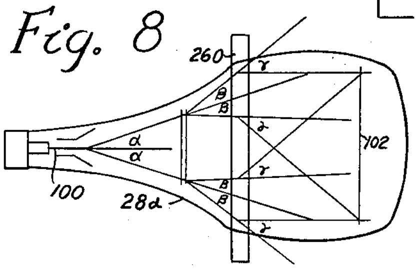

FIGURE 8 schematically shows how beams controlled by different transducers when reproducing the same symbol are brought to focus on the same target conductor representing the symbol; beams passing through the gaps of the end transducers in a row of transducers are used to illustrate extreme corrections provided by deflecting coils.

Figure 7:
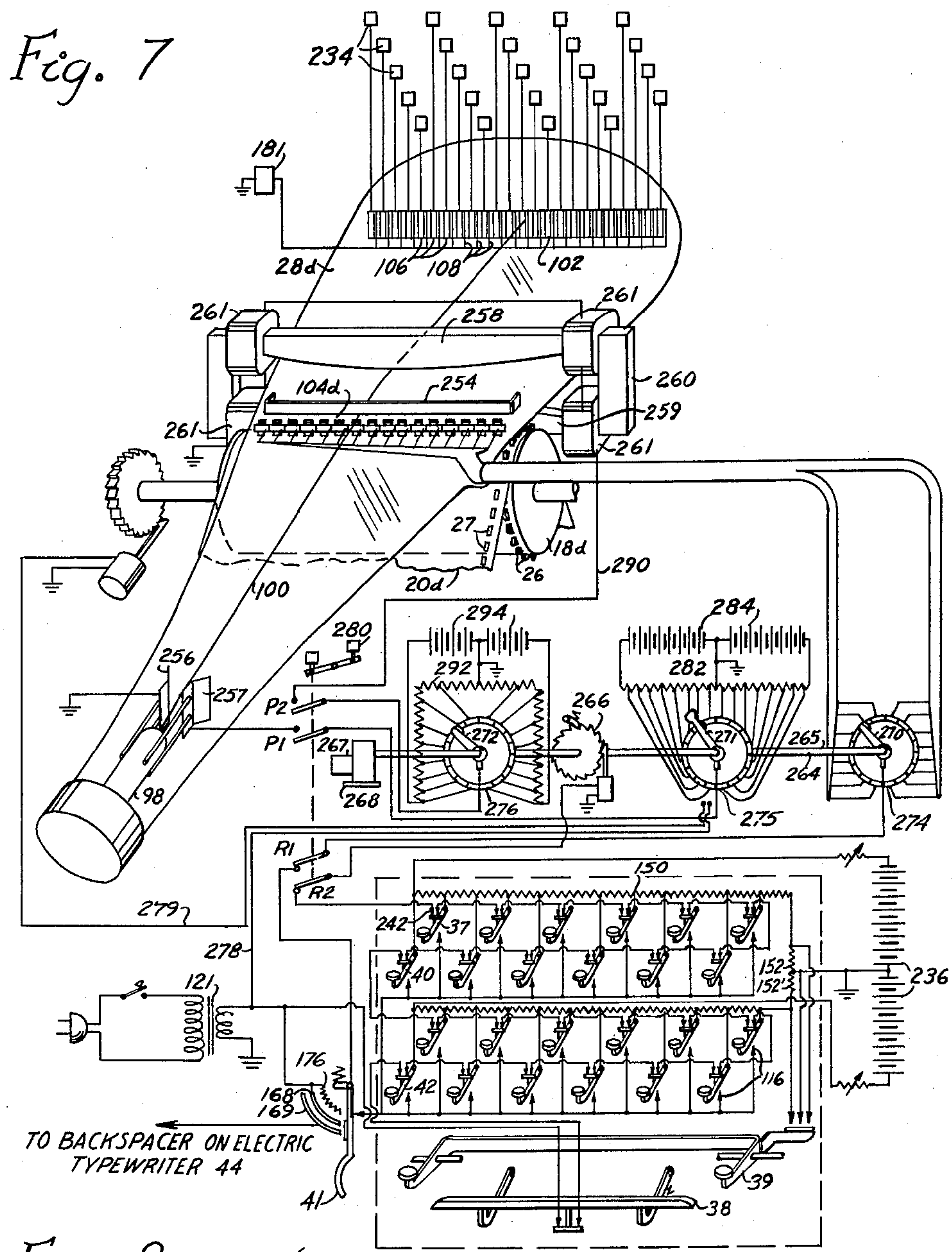
FIGURE 7 is a diagrammatic view of another variation of my recorder in which the electron beam scans over a row of transducers whereby a line of symbols can be recorded and reproduced without movement of the medium relative to the head tube.
Figure 9:
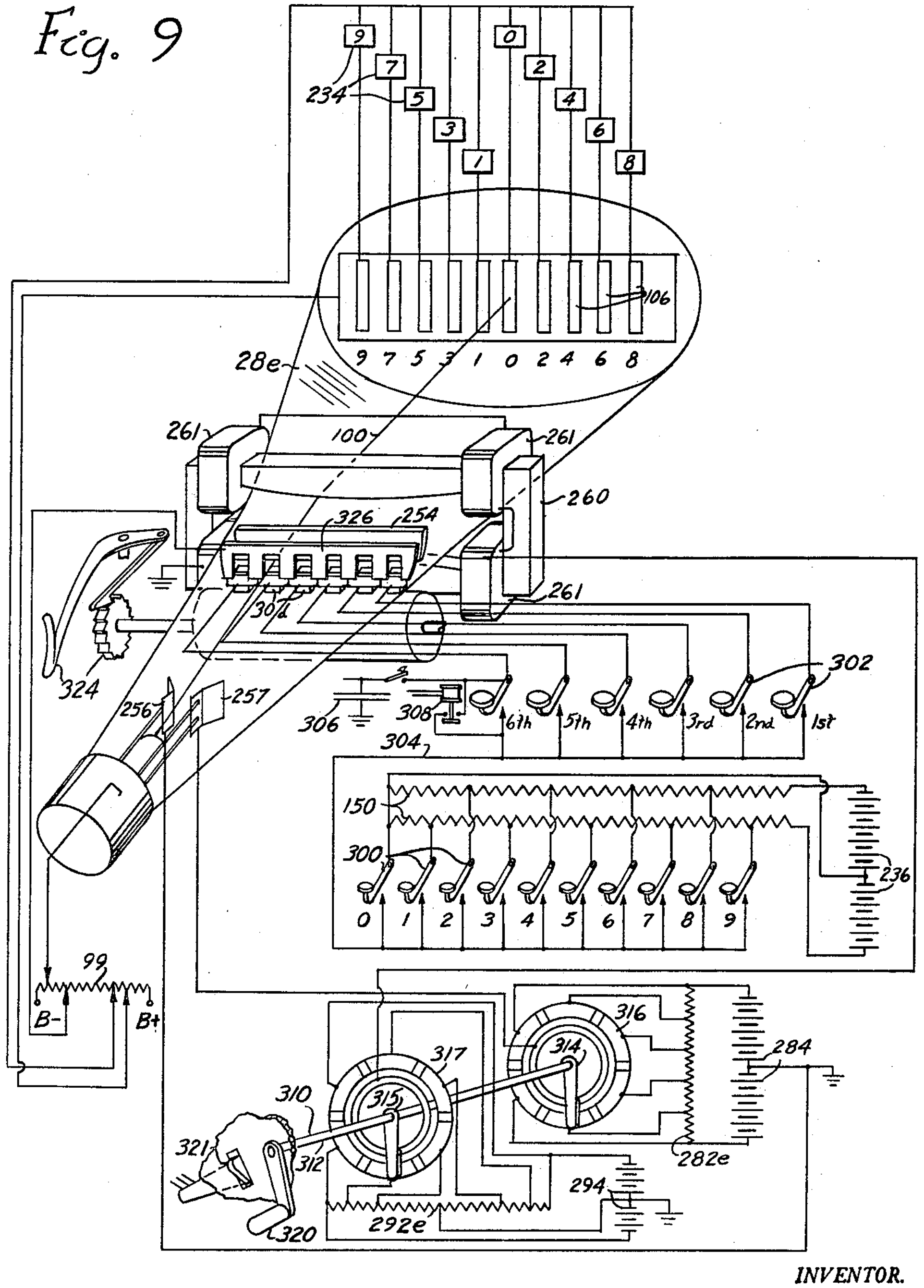

FIGURE 9 is a diagrammatic view of a number recorder having a scanning-beam head tube of the same type as that shown in FIGURES 7 and 8.

Figures 10, 11:
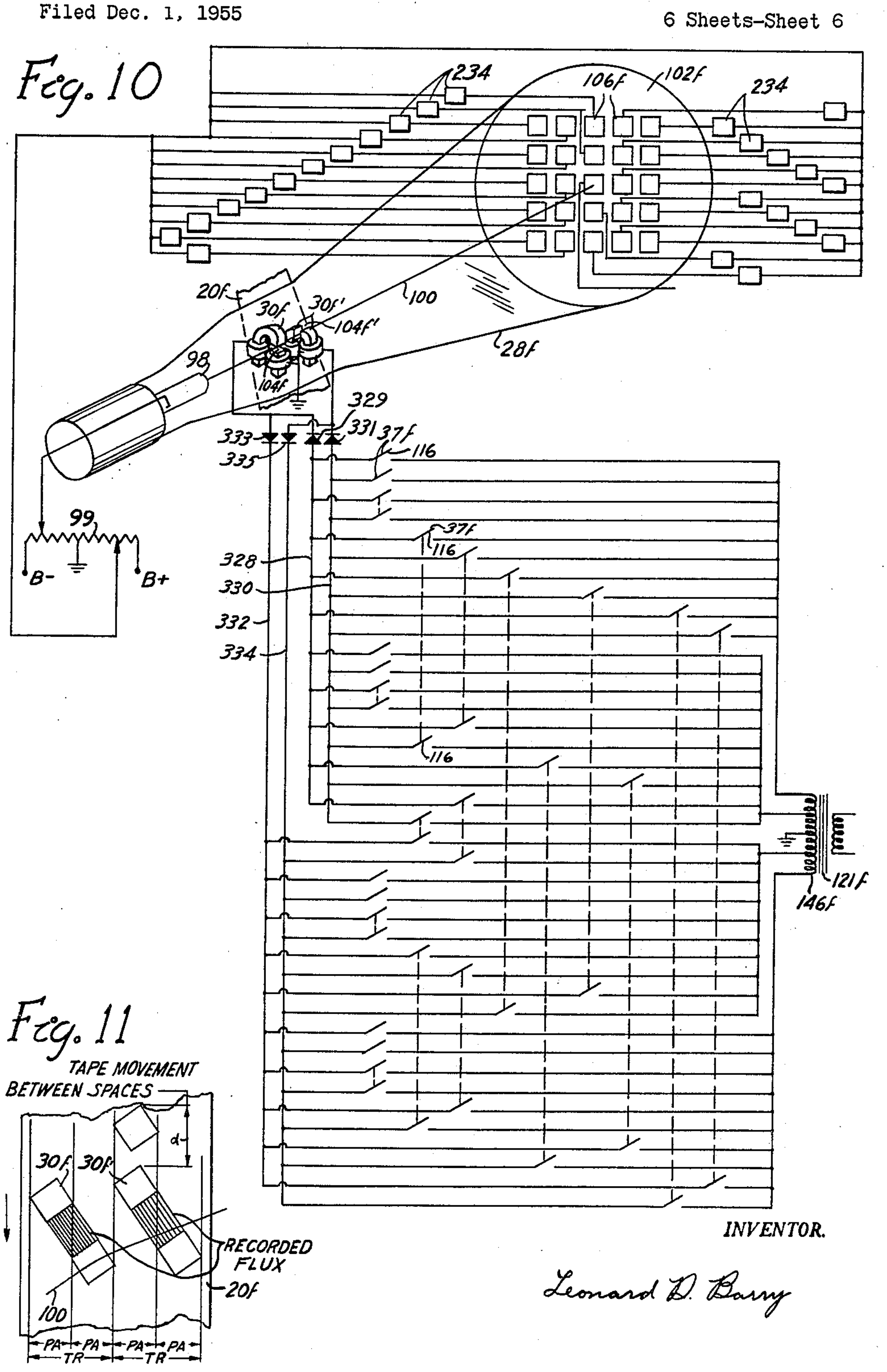

FIGURE 10 is a diagrammatic view illustrating a keyboard magnetic recorder wherein an electron beam is deflected in two directions by recorded signals.

FIGURE 11 is a schematic plan view of the preferred arrangement of the heads relative to the medium, its direction of movement, and the beam for the keyboard recorder of FIGURE 10.

Figures 1, 2:
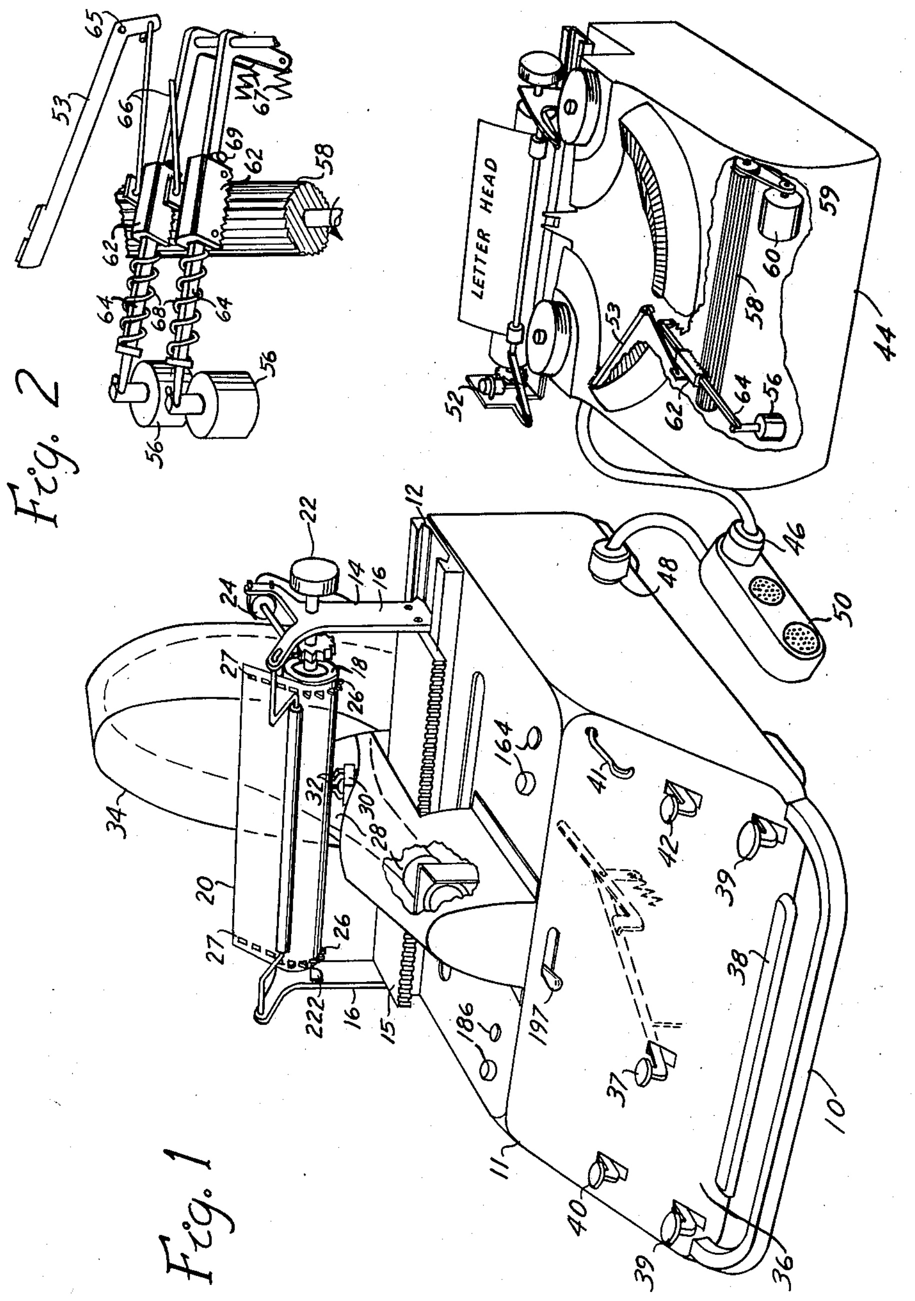
Figure 3:
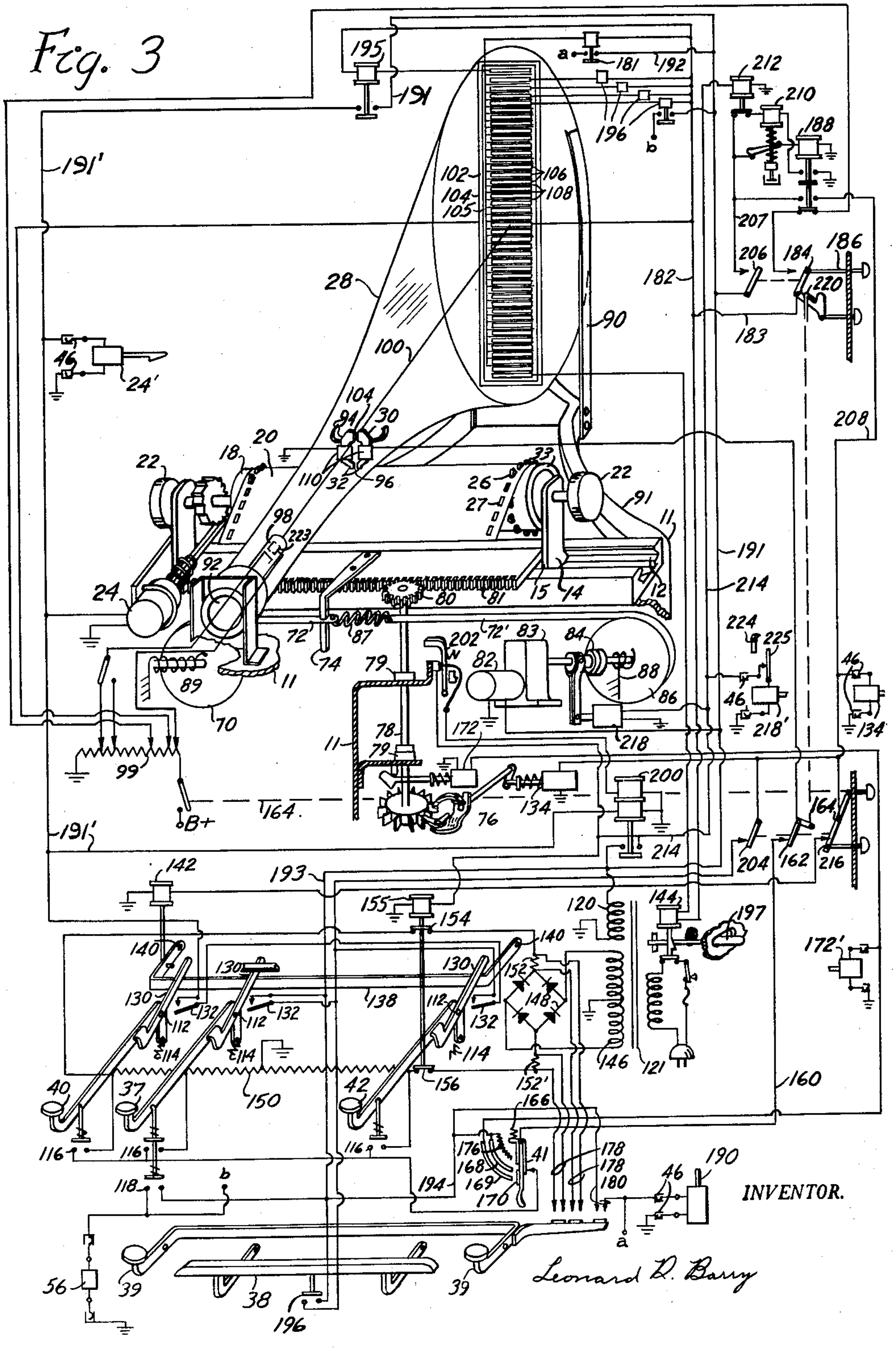
FIGURE 3 is a diagrammatic view illustrating electrical and control features of the recorder and writer of FIGURE 1.

Referring to the drawings and in particular to FIGURES 1 and 3, type recorder 10 has a typewriter-like frame 11 to which is secured a guideway 12 in which carriage 14 is arranged for horizontal movement. The carriage has a base 15 fitting in V-groove on the guideway. End pieces 16 of carriage 14 support cylinder 18, the platen, on which is carried a sheet of magnetic recording medium 20. Cylinder 18 is turned by hand knob 22 for inserting and removing medium 20 and is turned preferably by solenoid ratchet 24 during recording and reproducing one notch for each line of recording. Sprocket teeth 26 are spaced an even whole number of recording lines apart about each end of cylinder 18 and the magnetic medium as perforations 27 through which teeth 26 project as the preferred means to align the medium for line-for-line reproduction.

A recording-reproducing electron-beam tube head 28 is supported to frame 11 so that an electron-beam-deflecting magnetic transducer 30 having a pair of poles 32 extending through the wall of tube 30 will have these poles in engagement with recording medium 20. The tube has an ordinary electron gun and circuits for supplying an electron beam of desired velocity and size therefrom. The cylinder of FIGURES 1 and 3 has a soft rubber covering 33 to protect the beam tube when the cylinder is moved. The cylinder, as shown in FIGURE 1 is preferably located above the head tube for ease of insertion and removal of the magnetic medium. The other figures illustrating a beam tube show the tube above the medium for conveniently illustrating the tube, but these recorders can be rearranged to have the medium carried above or at the side of the tube if desired. An enclosure 34 protects the head tube of FIGURE 1, which is inserted from an opening in the rear.

The typerecorder has a usual typewriter keyboard 36 represented by a typical type or symbol key 37 and also has space bar 38, shift keys 39, line-index-and carriage return key 40, back-space and erase key or switch lever 41, and an end-of the-sheet shutoff key 42. A signal representing each key (zero signal for the space bar) is recorded by depressing that key, and each key except the shutoff key 42 operates an automatic electric typewriter 44.

The automatic electric typewriter 44 is electrically connected to typerecorder 10 through a multiconductor cable and plug 48 extending from the typewriter to a receptacle 48 on the recorder or, as shown, to a multioutlet receptacle 50 connected to the recorder which enables a number of these typewriters to be operated from a recorder at the same time. By appropriate wiring and switching typewriters 44 can be operated at various distant locations.

Typewriter 44 could of course be part of recorder 10 and operated by keys 37–40 of the recorder mechanically, electrically, or by any suitable means. Typewriter 44 has substantially the usual carriage 52, type bars 53, shift arrangement, ink-ribbon arrangement, etc. as on a typewriter; and, though keys are not shown thereon, it could have the usual keys whereby it could be operated separate from the recorder. The keys of the typerecorder are selected to operate solenoids 56 which control the type bars of the typewriter.

The preferred type-bar-actuating arrangement is shown in FIGURES 1 and 2. A fluted power shaft or roll 58 driven through reduction gearing 59 from motor 60 is arranged to be engaged by toothed blocks or dogs 62 each slidably secured on a lever 64. Each type bar 53 pivoted at 65 is linked by a rod 66 to a dog 62. A tension spring 67 holds lifted each lever 64. Dog block 62 is forced by compression spring 68 lightly against stop pin 69 in which position the block 62 is supported above the roller 58. Roller 58 is driven counterclockwise as viewed from the right-hand end of the typewriter as shown by arrow in FIGURE 2. A solenoid 56 is linked to the forward end of each lever 64 to pull down the lever when energized, engaging its dog 62 with roller 58, sending the dog block to the front along its lever, operating the type bar and compressing spring 68 with preferably sufficient momentum for block 61 to clear and remain clear of roller 58 until solenoid 56 is deenergized and spring 67 lifts lever 64 before spring 68 returns dog 62 to its first position above roller 58. The time interval during which solenoid 56 is energized is controlled by the recorder as will be explained. By utilizing a driven roller 58 as in the usual electric typewriter the type bars can be controlled by small solenoids relative to those that would be required to operate the type bars. The shift, line index and carriage return, back space, type bars, etc. can be as in the usual electric typewriter except that they are solenoid controlled instead of manually controlled; or, using larger solenoids they can be directly actuated if desired.

As shown in FIGURE 3, carriage 14 of the recorder is urged toward the left by the usual spring drum 70 pulling drawband 72 fastened to finger 74 which is secured to carriage 14 as on a typewriter. A solenoid operated escapement 76 controls indexing of the carriage to the left while recording and reproducing. The wheel of the escapement is secured on shaft 78 supported in bearings 79 to frame 11. Gear 80 secured on shaft 78 engages rack 81 secured on carriage 14. A carriage return motor 82 is connected through speed reduction gearing 83 and solenoid operated friction clutch 84 to drive drum 86 on which is wrapped an end of preferably another drawband 72′ secured to finger 74 through tension spring 87 and arranged to return the carriage to the right when motor 82 is operating and clutch 84 is engaged. Whenever clutch 84 is disengaged drawband 72′ is permitted to unreel from drum 86 against force of tensioning spring 88 which is weaker than the winding spring for drum 70.

FIGURE 3 also shows how the beam tube 28 might be secured by strap 90 to bracket 91 extending from the rear of frame 11. The base of tube 28 is inserted in a tube socket 92 secured on frame 11. The electromagnetic transducer 30 shown is similar to a two-core ring-type electromagnetic transducer except that the gaps are much increased and the two core pieces are not laminated so that their recording-pickup poles which extend through the wall of the tube can be conveniently sealed air tight to the wall of the tube. Clips 94 help hold the transducer to the tube's wall.

The longer the recording-pickup gap 96 and the longer the faces of poles 32 the longer the recorded lines of flux and the greater can be the signal for a given line width and medium thickness, but the longer the gap and pole faces the fewer the number of signal area units or spaces that can be accommodated across a given width of recording medium. Therefore, as an example and not as a limitation, selecting a recording gap of .09″, a recording-pickup pole length of .05″, and a clearance between recording areas of .01″ the length of a recording space=0.20″. The length of seventy space line would be 0.20×70=14.00″ which would mean about a 14½″ long cylinder. Adjacent spaces and lines of recording can be closely spaced, since the flux picked up by both poles 32 in a recorded space is equal and opposite.

Electron gun 98 secured in tube 28 and connected to voltage divider resistor 99 of a usual beam supply circuit directs electron beam 100 preferably to the middle of a signal reproducing area 102 through beam deflecting gap 104 between the core pieces of electromagnetic transducer 30 opposite the recording pickup gap 96. Deflecting gap 104 is large enough to permit the beam to pass through. The larger the recording gap relative to the deflecting gap the less the percentage of leakage flux between recording poles 32.

Reproducing area 102 either on the inner face of tube 28 or inward therefrom comprises preferably for a typerecorder a backing charge plate 104 (optional) having a sheet of insulating material or coating 105 on which are secured conductors as targets for beam 100 which are here shown as strips 106 and wires 108 run at substantially right angles to the beam and to the plane of the beam's deflection. Each target wire closely parallels a target strip so that beam 100 can hit both a strip and its paralleling wire at the same time. The insulating means 105 insulates strips 106 from each other and from wires 108. Each target strip 106 is connected by a conductor through a control or actuating means such as an amplifier, solenoid, or preferably in this recorder a relay arranged to connect power to a particular solenoid on the typewriter while beam 100 is on the strip 106 or wire 108 representing that solenoid.

Transducer 30 has a coil 110 on each of its cores connected so that poles 32 magnetize the medium 20 with opposite polarity. The medium is magnetized while stationary with a direct current having a polarity and value representing the signal being recorded. Transducer 30 when superimposed on a line-space area unit of recorded flux which this or a similar transducer has recorded is magnetized to an extent and in a direction depending on the recorded flux thereunder thereby establishing flux across gap 104 representing in amount and direction the recorded flux which is arranged to deflect beam 100 to a particular target strip 106 or to a target strip and its adjacent wire 108 to represent the recorded flux by closing a particular circuit for each recorded symbol. The transducer's coils 110 can be omitted where the transducer is used only for reproducing.

Keys 37, 40, and 42 are each pivotally secured to frame 11 at 112, and each held lifted by a tension spring 114 as on a typewriter. Each key 37, 40, and 42 is arranged to close when depressed a recording switch or contacts 116, each connecting a different voltage across the coils of transducer 30. Keys 37 also each close respective typing contacts 118, each connecting the secondary coil 120 of transformer 121 across the solenoid 56 representing that key on typewriter 44. The contacts of all the keyboard keys and space bar preferably yield after closing for ease of operation and to prevent chatter of these contacts.

A switch lever 130 for each key 37, 40, and 42 is also pivotally secured at 112 against its key and has a finger 131 which latches over the key when the key is pressed so that when spring 114 returns the key lever 130 is lifted closing its contacts 132. Contacts 132 for all but line-shift and carriage-return key 40 are connected in parallel to close a circuit which controls the escapements of both the typerecorder 10 and typewriter 44 by solenoids 134 and 134' respectively. Contacts 132 for key 40 close circuits to return the carriages of both the typerecorder and typewriter and index the carriages' cylinders to the next line. Contacts 132 close after the recording circuit is opened, so that the recording circuit is open when the carriage moves. A lift bar 138 running under levers 130 and pivoted on end arms at 140 for vertical movement is operated by solenoid 142 to return the switch lever 130 to open position upon completion of the circuit through the switch lever.

Because of its availability 60 cycle A.C. power is supplied to the primary of transformer 121 through back contacts of shutoff latching relay 144. A multitap voltage supply such as a D.C. voltage divider supplies the correct voltage to each key switch 116 and is here shown provided by connecting a center grounded secondary coil 146 of transformer 121 to A.C. terminals of a bridge rectifier 148 having connected across its D.C. terminals a center-grounded voltage-divider resistor 150 with resistor 152 and back contacts of relay 155 connected to the left-hand side of resistor 150 and back contacts 156 of relay 155 and resistor 152' connected on the right-hand side of resistor 150 all in series.

Keys 37, 40, and 42 each connect when depressed a different point on resistor 150 through normally closed contacts of backspace and erase switch 41, line 160, contacts 162 of record switch 164, transducer 30, and by ground return to center-tap of coil 146 of the transformer all in series. Contacts 162 of the record switch 164 are open while reproducing to insure that the recording will not be damaged by someone accidently depressing a key.

While D.C. saturation erase of the magnetic medium can be used with a recording current of demagnetizing polarity, it is preferred to reduce the maximum recording current by utilizing current of both polarities to achieve the same range of deflection in degrees of angle. Therefore means such as the center-neutral voltage divider 150 is provided to supply current of either direction to transducer 30 according to which key is pressed whereby opposite polarity sequences can be recorded. The polarity sequence of the recorded flux under the transducer determines the polarity of the poles of the transducer at the deflecting gap 104, which determines the direction of beam deflection (up or down). Before the recording medium is demagnetized preferably in mass by an A.C. erase magnet (not part of this invention and preferably separate from the recorder). Then equal and opposite D.C. recording currents recording different line-space recording area units on medium 20 will cause equal and opposite deflection of the beam upon reproduction of these signals.

Backspace and erase switch 41 is normally held closed by spring 166 for recording. When switch 41 is pushed to the left transducer 30 is first disconnected from the keyboard and then segment bars 168 and 169 are connected by a conductor piece 170 on and insulated from switch 41. The connecting of segments 168 and 169 closes a backspacing circuit across secondary coil 120 of transformer 121 which includes in series bars 168 and 169 and backspace ratchet solenoids 172 and 172' respectively on the recorder and typewriter. As lever 41 is further pushed to the left transducer 30 is connected across the secondary coil 120 of transformer 121 through rheostatic resistance 176 which is reduced the farther to the left switch 41 is moved whereby the transducer is operated as an A.C. erase head when switch 41 is pressed fully to the left and then returned by spring 166 gradually reducing the A.C. current per cycle reversal of magnetization under the transducer ready for rerecording when switch 41 again connects key switches 116 to the transducer.

Shift keys 39 close contacts 178, 178' and 180 when depressed. Resistors 152 and 152' are respectively bypassed through contacts 178 and 178' whereby the shorting of these resistors varies the recording current slightly for any key 37, 40, or 42 depressed whereby the reproducing beam is shifted to hit a strip and a wire when reproducing a recording made with a type key and a shift key simultaneously depressed. Target wires 108 are all electrically connected to the beam supply voltage divider 99 through shift actuating or control means such as the coil of relay 181, line 182, line 183, reproduce contacts 184 of reproduce start-stop switch 186, back contacts of relay 188 all in series whereby whenever both a strip 106 and the wire 108 are hit by beam 100 during a reproducing interval when relay 188 is dropped relay 181 connects a circuit that holds the typewriter in shift position while actuating the type bar represented by the strip 106 hit by beam 100. Accordingly relay 181 connects power across solenoid 190 through a circuit comprising from the top of secondary coil 120 line 191, line 192, front contacts on relay 181, point *a*, and solenoid 190 to the other side of coil 120 all in series. Contacts 180 connect the typewriter's shift solenoid 190 or control means therefore across coil 120 of the transformer by a circuit completed from coil 120, line 193, line 194, contacts 180, shift solenoid 140 to the other side of coil 120 all in series.

The strip 106 at the top of the reproducing area is selected to be connected through line-index and carriage-return relay 195 to line 182. The strips 106 which control the type bars 53 are connected each through a relay 196 which energizes a solenoid 56 on the typewriter across coil 120 through line 190, front contacts of the relay 196, point *b*, and solenoid 56 in series. The point or strip 106 to which beam 100 is directed when not deflected is selected to represent a blank space and is either open circuit or connected to line 182. Strip 106 at the bottom of the reproducing area is selected to be connected through shutoff latching relay 144 to line 182 whereby relay 144 when energized opens the power supply through its back contacts and is held lifted by its latch 197 until manually released.

Line-index and carriage-return reproduce relay 195 connects a circuit comprising in series from coil 120, line 191, front contacts of relay 195, line 191', and line shift solenoids 24 and 24' respectively on the recorder and typewriter in parallel with each other and with pullin coil of relay 200 to the opposite side of coil 120. Front contacts on relay 200 connect its hold coil across secondary coil 120 in series with switch 202 opened at the beginning of a line of recording by means such as finger 74 with movement of the carriage, connect the solenoid of carriage-return clutch 84 across coil 120, and connect relay 155 across coil 120. Relay 155 (optional) disconnects the voltage divider 150 supplying transducer 30 whereby the transducer will not record during the return of the carriage if an operator holds down a key.

Escapement solenoids 134 and 134' on recorder 10 and typewriter 44 respectively are connected across coil 120 of transformer 121 while recording and typing by a circuit from the top side of coil 120 including in series line 193, normally open contacts 196 of space bar 38 and contacts 132 of lever switches 130 for keys 37 and 42 in parallel, contacts 204 of record switch 164 closed in record position, escapement solenoids 134 and 134' in parallel, to the other side of coil 120; and during reproduce by a circuit from the top side of coil 120 including in series line 191, contacts 206 of reproduce start-stop switch 186, line 207, front contacts of relay 188, line 208, solenoids 134 and 134' in parallel to the other side of coil 120. Relay 188 is energized from line 207 through back contacts of relay 210. Relay 210 is energized from line 207 through back contacts of relay 212 and front contacts of relay 188. As shown, contacts of relay 210 are struck so as to swing open with momentum to allow relay 188 to be dropped for the desired length of time. Relay 212 is connected across transformer coil 120 by a circuit including from the top of coil 120 front contacts of stick relay 200, line 214, relay 212 to the other side of coil 120. Solenoid 142, which operates lift bar 138, is connected in a circuit across coil 120 including line 191, contacts 204 and 216 of record switch 164 in series, and solenoid 142, whereby solenoid 142 is operated only during keyboard typing. Carriage-return clutch operating solenoids 218 and 218′ respectively on the recorder and typewriter are connected through front contacts of stick relay 200 across transformer coil 120 by a circuit from the top side of coil 120 front contacts of relay 200, line 214, solenoids 218 and 218′ in parallel to the other side of coil 120. Solenoids 218 and 218′ could control both the line shift and carriage return, since on an electric typewriter one key controls both, thus eliminating line-indexing solenoids 24 and 24′.

Record switch 164 and reproduce stop-start switch 186 are preferably push button switches located on top of recorder 10 (see FIGURE 1). Switch 164 has a linkage finger 220 extending over the opening side of the lever between the buttons of switch 186 whereby when switch 164 is closed switch 186 is opened or open and vice versa, and either switch can be opened and closed with the other switch open.

*Operation*

To record and type with the recorder 10 and typewriter 44, connect as shown in FIGURE 1; record switch 164 is closed opening reproduce start-stop switch 186 through linkage 220 therebetween; the magnetic medium is inserted on the recorder so that the top of the medium is even with finger 222 secured to carriage 14 (see FIGURE 1); paper is inserted in the typewriter; both carriages are set to the beginning of their lines; and the left-hand marginal stop is set on the typewriter. The typist types at the recorder one or more letters or sheets of typing which can be recorded on one sheet of magnetic medium. At the end of the last line of typing on a sheet the typist presses shutoff key 42 which records a signal which stops the recorder when reproducing this sheet. If an error is made in typing the operator throws back-space and erase switch 41 to the left backspacing in this arrangement both the recorder and typewriter and then magnetically erasing the symbol under the transducer. The sheet in the typewriter need not be erased, since the correction can be typed over the error and when the recording is completed it can be used to automatically type corrected copies on good paper. Carbon copies are preferably not made until a good copy is produced, or typed copies can replace carbon copies.

Each key 37 when depressed actuates a type bar 53 and records a certain amount of flux into medium 20 under poles 32 of transducer 30. As the key 37 returns, recording contacts 116 open; after which contacts 132 are closed connecting power from line 193 through contacts 204 of record switch 164 to escapement solenoids 134 and 134′ which are energized to enable the escapements on the recorder and typewriter to index their carriages a space, and through contacts 216 on record switch 164 to relay 142 which opens contacts 132 ready for the typist to hit the next key. Key 40 when depressed closes a particular voltage across transducer 30 and when released recording contacts 116 open, and then contacts 132 are closed connecting power to line 187 and so to line indexing solenoids 24 and 24′ and the pullin coil of carriage return control relay 200 which is closed energizing carriage return clutch solenoids 218 and 218′ and is held closed through its front contacts until finger 74 on the carriage opens switch 202 dropping relay 200 when the recorder's carriage is brought to the beginning of the next line. The typewriter's carriage is returned before relay 200 drops, and the circuit of carriage return solenoid 218′ is opened by left-hand marginal stop finger 224 on the typewriter's carriage opening switch 225 as the left marginal stop is hit.

When less than a full sheet of recording is to be reproduced on one sheet of paper the operator presses key 42 after recording what is to appear on each sheet of paper thereby recording a signal which shuts off the recorder when reproducing. Key 42 also actuates a lever switch 130 indexing the cylinder one space on both the recorder and typewriter. The typist therefore need not press space bar 38 after hitting key 42 to continue recording on the same line. When the recorder shuts off at a shutoff signal recorded at a point before the end of typing; as, for example, at a shutoff point for making double line spaced copies when a single spaced copy is being made; the operator can manually move each carriage one space to the left and then release latch 196, and the recorder will continue to reproduce.

The portion of the recorded flux remaining on the medium depends on magnetic qualities of the medium, its thickness, and the treatment the medium receives after recording. The electron beam's velocity is adjusted by adjusting the voltage on the accelerating anodes of the electron gun at resistor 99. A higher beam velocity is used when reproducing a strong recording than when reproducing a weak recording so that the electron beam will be deflected the proper amount for each recorded symbol.

To reproduce from a magnetic sheet the top edge of the medium 20 is brought to coincide with the top of finger 222. If the recorder is not known to be set for the strength of the recording a scratch paper is inserted in typewriter 44 and with power on the start button of reproduce switch 186 is pressed in opening record switch 164 and closing contacts 184 and 206. If an intelligible recording does not result voltage or the accelerating anode 223 of the electron gun is adjusted relative to the cathode at resistor 99 until words are typed. The stop button of switch 186 is pressed in. The typewriter's paper is changed and both carriages returned to the starting point manually. Start button of switch 186 is pressed in and reproduction is automatic until the recorded stop signal is reached.

The closing of switch 186 connects the reproducing circuit through back contacts of relay 188 actuating the relay 144, 181, 195, or 196 connected to the strip 106 which is hit by beam 100 and connects power to relay 188 through back contacts of relay 210 and to relay 210 through back contacts of relay 212. Relay 188 takes sufficient time in opening its back contacts for the reproducing circuit to close its relay 144, 181, 195, or 196 and for this relay to complete its task. When relay 188 lifts it closes front contacts connecting power to escapement solenoids 134 and 134′. When sufficient time is allowed for solenoids 134 and 134′ to operate relay 210 opens its back contacts to relay 188 dropping relay 188 for the reproduction of the next symbol and so on until the end-of-the-line signal is closed through back contacts of relay 188 lifting relay 195 closing power through its front contacts to line index solenoids 24 and 24′ and pullin coil of stick relay 200 which quickly opens back contacts of relay 212 deenergizing relay 210, which was about to open after its time delay but is now prevented until carriage 14 opens switch 202 dropping relay 200 at the beginning of the next line. Relay 188 has thus been held lifted, holding the reproducing circuit open, blanking the beam's circuit during the return of the carriage. The dropping of relay 212 when the beginning of the line is reached energizes relay 210 which after its time interval opens deenergizing relay 188 which drops to close the reproducing circuit for the first line-space area unit of reproduction on that line. The dropping of relay 188 drops relay 210 which energizes relay 188 which closes power to operate escapement solenoids 134 and 134′, and so relays 188 and 210 alternately drop and lift each other controlling the speed of reproduction. This operation continues whether anything is recorded or not along a line. In unrecorded spaces only the escapement is operated.

*Variations*

Figure 4:
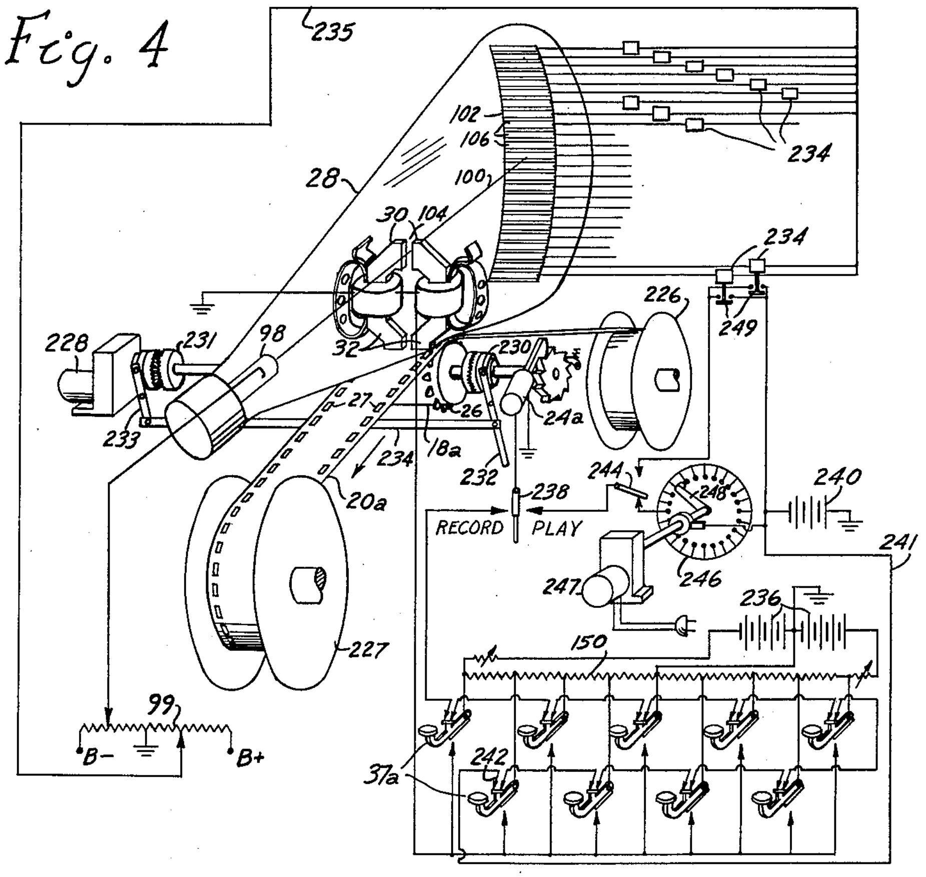
FIGURE 4 is a diagrammatic view of a variation of my type or symbol recorder arranged to record on and reproduce from a magnetic tape or film strip with either longitudinal indexing of the medium between each recorded symbol space or continous movement of the medium.

Referring to FIGURE 4 for a variation of the recorder that records in a single space along the length of a medium, a magnetic recording tape or film 20a is passed from reel 226 to reel 227 over drive sprocket cylinder 18a. Cylinder 18a can be driven in steps by a ratchet 24a or continuous by gear motor 228 for either recording or reproducing. Clutches 230 and 231 respectively connect solenoid ratchet 24a or motor 228 to drive cylinder 18a. Slip-collar yokes 232 and 233 respectively for operating clutches 230 and 231 are connected by linkage 234 so that only one clutch can be engaged at a time. Opposite poles 32 of transducer 30 engage opposite sides of the same face of film 20a. Electron gun 98 again sends beam 100 through the reproducing gap 104 to reproducing plate 102 having strips 106 each now connected through a reproducing device 234 (such as a relay, solenoid, amplifier, etc.) to line 235 connected to a point on beam supply 99.

The keys 37a close in parallel each a different voltage from voltage divider 150 through the coils of transducer 30 to ground return to battery 236 which is now supplying resistor 150.

Cylinder drive solenoid 24a is connected through record-play switch 238 to its operating circuits. In record position of switch 238 solenoid 24a is connected in a circuit having in series from battery 240, line 241, contacts 242 controlled by the keys in series so as to be closed when the keys are all lifted and open when any is depressed, record-play switch 238, solenoid 24a, and by ground to the other side of battery 240. Solenoid 24a is connected in play position of switch 238 through switch 244 to contacts of rotary contact switch 246 driven by gear-reduction motor 247 which turns arm 248 connected to the positive of battery 240 to automatically operate solenoid 24a at a satisfactory reproducing speed.

As an alternative to using motor driven switch 246, solenoid 24a can be connected in play position of switch 238 by switch 244 to the positive of battery 240 through front contacts 249 closed by each reproducing device 234 whereby cylinder 18a is indexed through the operation of each reproducing device.

The movement of the beam between signal positions is made quick relative to the operating time of the reproducing devices whereby these are only operated when the beam rests on a strip 106. When the magnetic medium is moved either by ratchet 24a or by motor 228 the beam or the reproducing circuit need not be blanked if the movement of the beam is too fast to operate the reproducing devices whose circuits are closed by the beam while moving between signal deflections.

By driving cylinder 18a continuously with motor 228 the recorder can be used to record and reproduce musical notes according to which key is pressed and the reproduction of each note will have a time duration proportional to other notes recorded according to the length of time the operator holds the recording keys closed. With a continuous drive the movement time of the beam between notes or signals is reduced the faster the tape speed during recording and the thinner the cores of transducer 30 in the direction of tape movement. The recording can be reproduced at different speeds. Reproducing devices 234 operating sound means such as organ stops will sustain each note as long as the recorded signal remains under the transducer. This means that recorded music can be extended or compressed to fill an allotted time without change of pitch. Various devices can be operated by each reproducing device 234 either simultaneously or at different playings of a recording.

Figures 5, 6:
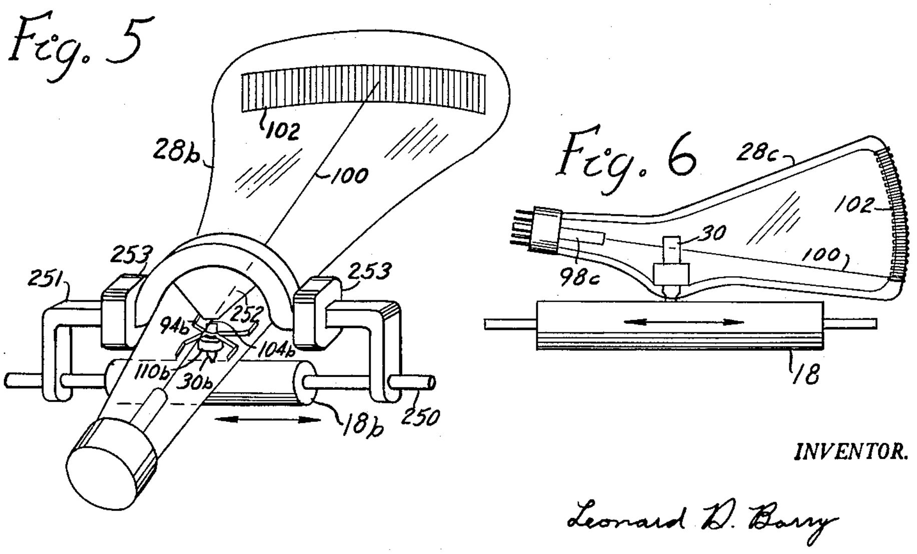
FIGURES 5 and 6 are respectively perspective and side views of variations of the beam tube head shown engaged with a medium carriage roller.

Referring to FIGURE 5 in which is shown a beam tube head 28b having a single-pole-piece transducer or needle as I prefer to call it supported to the wall of the tube by clips 94b. The magnetic circuit can be completed external to the tube by a magnetically soft cylinder 18b, cylinder shaft 250, bearing frame 251 which passes over the tube, and a plate 252 substantially in the form of a sector whose radii lines extend from a beam deflecting gap 104b provided between the plate and needle 30b substantially to or preferably through the wall of tube 28b to frame 251. Cylinder 18b can have axial movement as indicated by the double arrow for application of the recording medium on the tube in the recorder of FIGURES 1 and 3, or can be axially held for application on the tube in the recorder of FIGURE 4. Either external coils 253 about frame 251 or coil 110b on needle 30b or both are provided for recording.

In FIGURE 6 is shown another variation of the electron beam tube head and a variation of the positioning of the tube relative to the cylinder. Head tube 28c is aligned vertically parallel with cylinder 18, and the gaps of its ring-type transducer 30 are parallel to the plane of view. The tube, designed to reproduce recordings made with a single polarity of recording current, has electron gun 98c arranged to direct beam 100 to an end of the reproducing plate 102. The recorded flux deflects the beam toward or beyond the center of the reproducing area.

Where D.C. saturation erase is used a single direction of recording current is provided to demagnetize the medium to various extents. This demagnetizing signal current has a D.C. bias current added to demagnetize the medium a little beyond the self-demagnetizing point on the B—H curve for the medium when removed from the head tube and cylinder. Such a recording will not as readily change or become demagnetized slightly by stray fields encountered in handling or storage as does a recording made on a demagnetized medium.

Where it is desired to record in transverse rows across medium stored on reels it is preferred to provide an axially stationary carriage and have a transducer within the tube for each type or signal space across the recording medium. Such an arrangement is shown in FIGURE 7 wherein tube 28d has a row of needle-like transducers 30d therein whose recording-pickup poles 32d extend through the wall of the tube and engage a magnetic recording film 20d carried by cylinder 18d again having sprocket teeth 26 engaging perforations 27 in the medium along the edges thereof. A magnetically soft strip 254 is secured across the tube above the needles to attract the flux above the needles forming therewith the beam deflecting gap 104d.

Electron gun 98 again provides beam 100. Horizontal deflecting plates 256 and 257 sweep beam 100 across the tops of needles 30d which deflect the beam according to the recording engaged by each needle. The beam then passes through a vertical magnetic field between scanning position correcting poles 258 and 259 of an electromagnetic deflecting yoke 260 before passing on to reproducing area 102, since the directions in which the recorded signals deflect the beam are in the plane of scanning. Poles 258 and 259, respectively above and below tube 28d, have their facing faces curved toward each other at their centers vertically in line with the center of the tube and extend crosswise the tube so as to provide an even amount of flux through which the beam passes irrespective of the deflection of the beam by the transducers. Yoke 260 surrounds tube 28d between the transducers and the reproducing area and has preferably four coils 261 connected in series arranged to magnetize yoke 260 so as to provide a sheet of flux through which beam 100 passes.

The horizontal sweep of the beam 100 is in steps between transducers 30d, the beam being directed through a point centered above each needle and held there while the recorded character is read and then quickly passed on to the next. Each beam position requires a different correction to cancel the effect of the sweep of the beam at the reproducing area.

A rotary contactor assembly 264 preferably supplies the correct voltage to plates 256 and 257 for each step of beam 100, the correct voltage to yoke 260 for each beam step correction, and connects the keyboard switches 116 to the transducers in succession from left to right. Conductor 264 has shaft 265 driven by solenoid ratchet 266 for recording and driven by motor 267 through a speed reduction transmission 268 for replay. On shaft 265 are secured contact fingers 270, 271, and 272 of respectively rotary contact switches 274, 275, and 276 driven clockwise by either the ratchet or the motor. Each rotary contact switch has the same number of contacts (one for each transducer) equally spaced in a circle. The fingers are arranged to coordinate operation so that when finger 270 connects a particular transducer to the keyboard, finger 271 connects the voltage on plate 257 which will deflect the beam to a point above the transducer, while finger 272 connects voltage to yoke 260 which will provide a beam deflecting flux that will cancel the effect of the plates deflection of the beam at the reproducing area. Each revolution of shaft 265 successively connects contacts for one line of recording across medium 20*d*. Finger 271 connects line-shift ratchet solenoid 24*d* across secondary coil 120 of supply transformer 121 through lines 278 and 279 as the fingers connect circuits for recording or reproducing with the first transducer at the left.

For recording, the coil of each transducer from left to right is connected to a contact segment on switch 274 starting from the bottom left contact respectively in succession clockwise to the bottom right. Keys when depressed connect through record contacts 116 each a different voltage to the transducer connected by finger 270. Solenoid ratchet 266 indexes shaft 265 to the segment connecting the next transducer to the right each time a recording key or the space bar is returned.

The lines of recording are solid (including zero signal of the space bar) and have no relation to the lines of typing etc. reproduced therefrom. Several short or blank lines of typing can be recorded on one line, or a line of typing may take more than a line of recording. The beam can return to the beginning of the next line in practically the same time it takes to move from space to space and much faster than a carriage, but shaft 265 is turned slow enough to allow the typewriter carriage to return before the next reproducing device is operated. There can be any possible number of transducers per line.

For reproducing, a voltage divider 282 connected across end terminals of center grounded battery 284 has a tap connected to each segment of rotary switch 275 for supplying the deflecting voltage to center beam 100 over each transducer. The midpoint of resistor 282 is connected to the center tap of battery 284. Horizontal deflecting plate 257 is connected through contact P1 closed in play position of switch 280 to finger 271. Deflecting plate 256 is grounded.

FIGURE 8 illustrates how a sheet of flux supplied by yoke 260 bends beam 100 according to the voltage on the horizontal deflecting plates 256 and 257. As beam 100 scans the row of transducers it is deflected toward the center of the reproducing area by vertical flux established by current through coils 261. This current is greatest and opposite when beam 100 passes above needles at opposite ends of the row and is reduced (for a considerable extent nonlinearly) to zero so as to reduce the flux approximately linearly to zero as the beam passes the center of the row of needles. With equal deflection in each direction plates 256 and 257 deflect beam 100 $\alpha$ degrees in each direction; each needle can deflect beam 100 $\beta$ degrees in either direction; and yoke 260 deflects beam 100 passed over the end needles $\gamma$ degrees toward the center of the tube to bring the beam to the proper strip 106 on reproducing area 102. The distance between yoke 260 and the reproducing area is less the more powerful the yoke.

Returning to FIGURE 7, beam position correcting coils 261 are connected by line 290 and ground return through contacts P2 closed in play position of switch 280 and finger 272 in series across points on preferably another voltage divider 292. Though added taps on divider 282 could provide the needed voltage, by using two voltage dividers adjustments are independent. Center tapped battery 294 supplies current across resistor 292. Center taps are connected and grounded. The taps are so located on resistor 292 as to provide the proper flux with each beam-over-transducer position.

As shown by FIGURE 9, where numbers are to be recorded exclusively the recorder of FIGURE 7 can be simplified by reducing the keyboard to 0–9 number keys 300 and by replacing rotary contact switch 274 with digit keys 302 each connecting the output of the number keyboard to a transducer for each digit.

Tube 28*e* has six transducers 30*d* connected from right to left to digit keys 302 for respectively the 1st, 2nd, 3rd, 4th, 5th, and 6th digits. Each digit key when depressed closes its transducer 30*d* across line 304 and ground. Number keys 300 for numbers 0–9 when depressed each connect a different voltage tap on voltage divider 150 to line 304 whereby a voltage representing any number 0–9 can be connected to any transducer 30*d* by simultaneously depressing a number key and a digit key.

The key for zero is selected to connect zero voltage, and the other number keys select each a number of units of voltage corresponding to the number of the key. A charge from an induction coil or condenser 306 could then be discharged through a particular transducer to record the peak current representing a number in a particular digit. Or each key 300 and 302 can be bypassed by contacts of a relay 303 for automatic recording.

Ten reproducing strips 106 are provided in tube 28*e* each in the circuit of a reproducing device 234 for each FIGURE 0–9.

Reproducing is controlled by turning rotary switch assembly 310 once for each number. Switch assembly 310 has a shaft 312 on which are secured contact fingers 314 and 315 of respectively six-segment rotary contact switches 316 and 317. Each segment of switch 316 is connected to a point on voltage divider 282*e* connected across battery 284 for providing deflecting voltage on plates 256 and 257 in steps. Each segment of switch 317 is connected to a point on voltage divider 292*e* connected across battery 294 for supplying the correcting current to yoke 260. Center points on the voltage dividers are connected to center taps on their batteries. Horizontal deflecting plates 256 and 257 are respectively connected to the center tap of battery 284 and finger 314. Coils 261 of yoke 260 are connected to finger 315 and ground return to battery 294. Shaft 312 is rotated by means such as crank 320 which engages a spring stop 321 after completing one revolution. Stop 321 is depressed for crank 320 to pass. The crank is turned in a direction depending on the arrangement of the reproducing devices. The segments and fingers of assembly 310 are arranged to connect voltage to deflect beam 100 in steps to a point over each transducer in succession and to provide the proper correction for each deflection. Lever operated ratchet 324 provides for the turning of cylinder 18*e*.

If it is desired to blank out the beam when passing from needle to needle a conductor strip can be provided between each needle to intercept the beam between needles. These strips are electrically connected forming a blanking comb 326.

Both horizontal and vertical deflection of the electron beam to targets arranged in a plurality of rows or directions is provided by the arrangement shown in FIGURES 10 and 11. With a relatively small deflection in each direction a large number of target units can be arranged to be struck according to the combined deflection of two transducers.

In electron beam tube 28*f* the beam 100 passes in succession through beam deflecting gaps 104*f* and 104*f′* of respectively the horizontal and vertical deflecting transducers 30*f* and 30*f′* as it passes from electron gun 98 to reproducing area 102*f* within the tube.

For illustration the reproducing area is selected to have twenty-five spaces or targets 106f. Targets 106f are shown each as a square and are of conductive material either cemented on the face of tube 28f or embedded therethrough where the tubes face is an insulating material such as glass, or they are supported within the tube by any suitable means. The targets are arranged in horizontal and vertical rows of five targets each. Beam 100 is directed to the center target when not deflected. Reproducing devices 234 are connected each from a target to beam supply 99.

The transducers 30f and 30f' are preferably two-core longitudinal-recording-pickup transducers as shown. The deflecting gaps for the horizontal and vertical deflecting transducers are respectively horizontal and vertical.

Though various types of magnetic recording medium can be used a tape 20f is shown. The recording-pickup poles of the transducer are arranged and the tape is drawn by any suitable means past these poles in such a direction that the recording-pickup poles each lie in a different parallel path PA on the medium (see FIGURE 11), poles of the same transducer lie in adjacent recording paths, and each transducer has its own track TR on the medium. This arrangement prevents interference between the recordings of the two transducers, enables close spacing of the transducers, and enables minimum movement of the medium between recording spaces for a given length of recorded flux. Beam 100 is directed over one pole of the horizontal deflecting transducer and between the deflecting poles of the vertical deflecting transducer which are wide enough apart to accommodate the full horizontal deflections of the beam. The tape is moved distance *d* between recorded symbols.

Twenty-four keys 37f are provided, one to record a flux to deflect the beam to each of the twenty-four targets surrounding the central target. Secondary coil 146f of supply transformer 121f has a voltage tap for each unit of deflection which is made the same for both horizontal and vertical deflections. Coil 146f therefore has five equally spaced taps, the center tap being ground. The upper two taps are each connected through five key switches 116 in parallel to line 328, rectifier 329 arranged to pass positive half cycles, coils of horizontal transducer 30f, in series to the center tap of coil 146f by ground return. The upper two taps are also connected through five other key switches 116 in parallel to line 330, rectifier 331 arranged to pass positive half cycles, coils of vertical transducer 30f', in series to the center tap of coil 146f by ground return. The lower two taps are each connected through five key switches 116 in parallel to line 332, rectifier 333 arranged to pass negative half cycles, coils of horizontal transducer 30f, in series to the center tap of coil 146f. The lower two taps are also each connected through five other key switches 116 in parallel to line 334, rectifier 335 arranged to pass negative half cycles, coils of vertical transducer 30f' in series to the center tap of coil 146f. The rectifiers convert the A.C. tapped voltages to D.C. for recording. Ripple filters are not necessary, since the peak current is the recorded current.

Where the recording is to deflect the beam either horizontally or vertically one switch 116 is closed for each key. Where the recording is to deflect the beam in two directions two key switches 116 are closed together by linkage represented by dashed lines between these switches, one switch connecting a voltage to each transducer. By closing each of the twenty-four keys one at a time beam 100 can be set to be directed either directly or from the recording to twenty-five different targets as can be seen by following the circuit or circuits closed by each key shown.

It is understood that the medium can be drawn past the transducer tube without the aid of a cylinder depending on such things as the shape of the tube and the direction of movement of the medium, since the medium can be drawn across the tube in tension. Other carrying and holding devices can be provided for the medium. The cylinder could be the recording medium.

The beam can be deflected by deflecting plates or yokes to reproduce on different rows or groups of targets within the tube if desired.

In elementary form only one target need be provided to be struck or not struck according to the recorded signal.

Thus it is evident that the purpose of my invention is to provide means to record given amounts of flux for various symbols or signals on a magnetic medium and to provide means to utilize the recorded flux to complete a circuit representing the recorded flux.

Having thus described several forms of my invention it is understood that I wish to cover all variations and modifications which fall within the true spirit and scope of this invention and not just to that described and shown, since it is realized that those skilled in the art may find various other modifications which fall within this invention as claimed in the following claims.

I claim:

1. A magnetic-recording reproducer which comprises an electronic beam distributor tube having therein an electron gun circuit means connected to said tube to provide an electron beam, a recording medium, polarized magnetic spots recorded on said medium and having an external flux for deflecting the beam of said tube a given amount to represent a symbol, a magnetic transducer in said tube having at least one pole positioned to receive flux from a said polarized spot on said medium outside of said tube and an inner pole to deflect said beam according to the flux received from said spot on the recording medium, means for positioning and engaging said medium adjacent said transducer for reading said spots and a row of several conductors insulated apart and arranged successively across the path of said beam in the plane of the beam's deflection; and reproducing devices including circuit means connecting each said reproducing device from the electron beam's input supply to a said conductor whereby the beam closes the circuit for actuating the particular reproducing device representing the flux polarity and density picked up by said transducer.

2. A sheet of recording material having adjacently and orderly located discrete polarized magnetic spots of significant flux density, each said spot being a complete signal to control a particular function of a machine which function is represented by the flux density of said spot, a cathode ray tube adjacent said recording material, said cathode ray tube having an electron gun for developing an electron beam for easy deflection, magnetic transducer means within said cathode ray tube positioned adjacent the path of said electron beam operable to conduct magnetic flux from a said spot to deflect the electron beam in said tube, at least one target in said tube positioned to be struck by the beam when deflected by a spot of a particular flux density and polarity, and a circuit completed through that target for reproducing the function represented by the target when struck by said beam for a sufficient period of time whereby the function represented by the recorded spot is reproduced.

3. In a combination as in claim 2, one or more of said spots having substantially zero net external flux and being a complete signal to control a function of a machine.

4. In a magnetic record as in claim 2, said spots each having a significant polarity.

5. On a magnetic keyboard recorder wherein signal pulses are recorded on a magnetic medium and the medium is indexed between pulses to the next signal space, in combination, a back spacer to be pressed by a human finger, a magnetic record-erase head, a magnetic medium magnetically engaged with said head, a transport for indexing said medium past said head after each recorded pulse, said back spacer being arranged to move said medium back one signal space relative to said head when said back spacer is pressed, an alternating current magnetic erase circuit including in series a rheostat connected by said back spacer when further pressed and actuated by increasing pressure to increase erase current to said head and to reduce current to said head upon release of said back spacer by the operator so as to erase a recorded signal in the signal space back spaced to, the erase current passing through several cycles as it is diminished by said rheostat to magnetically erase the space as pressure on said back spacer is released.

6. A magnetic recorder for symbols comprising in combination: a recording medium, a plurality of magnetic recording means each for recording on said medium a different signal comprising a group of magnetic spots, means for positioning and moving the medium relative to said recording means to record the signals successively along said medium, a plurality of electrical reproducing circuits each representing a said recording means, a plurality of actuating means each of which operate to represent a particular symbol, each of said circuits having means to control the said actuating means represented by the group of spots produced by the said recording means represented, an electronic beam of similar charged particles, target means in series in each of said circuits controlled by the impinging of said beam thereon to complete the circuit, and transducer means having pole means of a size and positioned to pick up a constant flux simultaneously from all of said spots in each said group as said medium is moved past the transducer means by said means for positioning and moving, said transducer means being in the path of said beam to control the deflection of said beam according to the flux density given said transducer means by the group of spots from which the transducer means is picking up flux to deflect said beam to the said target means represented by the group of spots, each said group of spots providing a flux density in said transducer means when engaged therewith to represent the recording means actuated in recording the group of spots, whereby the recording means which made the group of spots is represented by the particular said actuating means actuated when the transducer means is located on that group of spots.

7. In a recorder as in claim 6, a recording key for operating each said recording means, a shift key, circuit means closed by said shift key for varying the amount of flux recorded a substantially fixed amount when any said recording key is also operated, a shift target adjacent each first said target in said tube and positioned to be struck by said beam when said transducer means is picking up a signal recorded with said shift key held actuated, said beam having a cross-section area to simultaneously impinge either a first target alone or together with a shift target according to the beam's deflection, a shift circuit associated with said shift target to be controlled by the impingement of the beam on the shift target, and means controlled by said shift circuit to modify the function of any said actuating means to represent the shift, each said actuating means having means to be so modified.

8. In a recorder as in claim 6, said spots being considerably longer in the direction of movement of the medium than the width of said transducer means where magnetically engaged with said medium and measured in the direction of movement of the medium, said medium being substantially steadily driven whereby said transducer means dwells on each said spot.

9. In a magnetic recorder as in claim 6, each for operating a said recording means, said means for positioning and moving a magnetic medium comprising a sprocket cylinder on its axis, a solenoid ratchet connected thereto to turn said cylinder on its axis and a circuit closed through said solenoid ratchet when any of said keys are lifted energizing said solenoid ratchet upon the return of the key depressed, whereby the medium is moved to the next recording space after each recording.

10. In a magnetic recorder as in claim 6, a relay, a circuit controlled by said beam connected through a said target means to control said relay, said relay having contacts controlling said beam to turn off said beam from operation on said target means, and holding means for said relay to maintain said relay in energized position after operating, and release means controllable by an operator for releasing said relay to enable said recorder to operate, and means to record a magnetic signal for deflecting said beam to said target means upon replay of said signal.

11. In a magnetic recorder as in claim 6, said means for recording including: coil means on said transducer means, recording keys each having a first switch closed when the key is depressed, a direct current power supply having a common and a plurality of taps each at a different voltage, circuit means connecting one end of said coil means to each said tap through a said switch and the other end of said coil means to said common whereby a depressed key provides a recording current having a value representing the depressed key, all other said keys being up.

12. In a magnetic recorder as in claim 11, said means for positioning and moving a magnetic medium comprising a cylinder having means for locating and holding a magnetic medium thereon, a carriage supporting said cylinder so as to have transverse movement relative to said transducer means a solenoid operated escapement arranged to control movement of the carriage to carry a magnetic medium thereon in a series of movements past said transducer means, a circuit for energizing the solenoid of said escapement switch means for closing said circuit and positioned to be closed by any of said keys when depressed, and another said key and means controlled thereby to return and index said carriage for the next line of recording when this key lifts.

13. In a magnetic recorder as in claim 11, said transducer means comprising a row of transducers arranged to record in succession transversely across a magnetic medium, switch means in series with each of the transducers to connect voltage from said switches selectively to successive said transducer means, and means to index said switch means as each said key is returned to connect the next said transducer means for recording therewith the next time a said key is depressed.

14. In a magnetic recorder as in claim 13, said switch means comprising a rotary switch having contacts substantially evenly spaced therearound each successive contact being connected to a successive transducer by said circuit means, said switch means being a rotary switch, said means for positioning and moving said medium being arranged to move the recording medium substantially at right angles to the row of transducers, and a circuit including contact means closed by the revolution of said rotary switch each time the rotary switch is closed to the first transducer in said row and means controlled by said last mentioned circuit means to index the magnetic medium to the next recording line.

15. A magnetic reader for symbols comprising in combination: a beam tube and circuit means for providing a narrow beam of electrically charged particles, a recording medium having a row of magnetic pole spots recorded thereon; transducer means comprising magnetically soft core means having a pole of a size for magnetic pickup from the medium of a single said spot; means for guiding and moving said medium past said pole to magnetically engage said spots successively with said pole; a plurality of electrical circuits, each said circuit having actuating means to perform a function represented by the flux density of one of said spots, an electronic beam of similarly charged particles; target means in each said circuit for controlling said circuit; each said target means being operated to control the circuit by impingement of said beam thereon; said transducer means including a gap through which said beam is directed for deflection according to the polarity and flux density in said transducer means established by a said spot magnetically engaged by said transducer means, means for controlling the movement of said recording medium in relation to the size and placement of the spots and the size of said pole for providing a predetermined dwell of said pole on said spots to provide a dwell of said beam on a said target means to make the said actuating means responsive to perform the function represented by the said spot being read.

16. A magnetic symbol reproducer comprising in combination, a recording medium, a cathode ray tube, a row of targets insulated apart and secured in said tube, an electron beam in said tube, first deflecting means to direct the beam in a line along said targets, magnetic transducers aligned in a row and secured to said tube between said deflecting means and said targets each said transducer having a beam deflecting pole face adjacent a line along which the beam sweeps and a magnetic pickup pole aligned to magnetically engage said medium, a plurality of circuits each associated with a said target to be controlled by the impinging of said beam on the target, a plurality of actuating means each to perform a different function represented by a different recorded symbol and each controlled by a said circuit, said medium having a row of magnetized spots each located to align and magnetically engage with a pickup pole on a said transducer and means to so align said medium on said transducers, first sweep circuit means connected to said deflecting means for directing said beam successively past each of said transducers, second deflecting means between said transducers and targets, and canceling sweep circuit means connected to said second deflector means for annulling the sweep of said beam provided by said first deflecting means when the beam reaches the row of targets, whereby the deflection given the beam by a particular spot engaged with any of said transducers will direct said beam to a particular said target to actuate the said actuating means to perform the function represented by the spot.

17. In a reproducer as in claim 16, a blanking plate between said transducers and said first deflecting means for blocking said beam when moving from one transducer to the next, openings in said plate located to allow said beam to pass through when correctly directed past a said transducer.

18. In a reproducer as in claim 16, said sweep circuit means being a stepping sweep circuit to step said beam to align and dwell over each said transducer.

19. In a reproducer as in claim 18, means controlled by said actuating means to control said first sweep circuit means to step said beam after said actuating means has operated.

20. In combination; a sheet of recording material having adjacently and orderly located discrete polarized magnetic spots of significant flux density, each said spot being a complete signal to control a particular function of a machine which function is represented by the flux density of said spot, an indexing transport for said sheet, reading means registering with said sheet and transport for reading the flux density and polarity of each successive said spot, plural operating means controlled by said reading means according to the flux density and polarity read to perform a function represented by the signal read, and means controlled by said operating means for controlling said transport to index to the next said spot after said operating means operates.

21. A magnetic recorder for symbols comprising in combination: a recording medium, a plurality of magnetic recording means each for recording a distinctive density and polarity of flux within a signal space on said medium, transport means for positioning and moving said medium relative to said recording means for recording successive signals in successive adjacent signal spaces along said medium, an electrical output circuit representing each said recording means, a plurality of output means each energized to represent a particular symbol and each controlled by a said circuit, an electronic beam of similar charged particles, target means in series in each said circuit controlled by the impinging of said beam thereon to complete the circuit, transducer means having pole means of a size and positioned to pick up a constant flux from each signal space successively as said medium is moved by said transport means, said transducer means having poles on opposite sides of said beam for deflection of said beam according to the flux density picked up by said transducer means from the medium to deflect the beam to the said target means represented by the signal space to control the circuit represented by the recording means which was operated to record the signal being read.

22. In a recorder as in claim 21, each said signal space being substantially the same dimensions, said transport indexing the medium one signal space.

23. In a recorder as in claim 21, said transport being operable to index said medium one signal space each time a recording means is operated and selectably operable to continuously run while successive said recording means are operated.

References Cited in the file of this patent

UNITED STATES PATENTS

| | | |
|---|---|---|
| 2,436,829 | Roth | Mar. 2, 1948 |
| 2,474,810 | Arditi et al. | July 5, 1949 |
| 2,534,369 | Ress | Dec. 19, 1950 |
| 2,558,187 | Marrison | June 26, 1951 |
| 2,560,166 | Glenn | July 10, 1951 |
| 2,564,908 | Kuchinsky | Aug. 21, 1951 |
| 2,565,486 | Feinstein et al. | Aug. 28, 1951 |
| 2,567,812 | Hickman | Sept. 11, 1951 |
| 2,580,977 | Tourshon | Jan. 1, 1952 |
| 2,605,353 | Salmon | July 29, 1952 |
| 2,614,169 | Cohen | Oct. 14, 1952 |
| 2,628,689 | Rieber | Feb. 17, 1953 |
| 2,657,377 | Gray | Oct. 27, 1953 |
| 2,657,378 | Gray | Oct. 27, 1953 |
| 2,679,035 | Daniels | May 18, 1954 |
| 2,700,067 | Lockemann | Jan. 18, 1955 |
| 2,706,079 | Connolly | Apr. 12, 1955 |
| 2,707,246 | Zuerker | Apr. 26, 1955 |
| 2,713,676 | Fleming | July 19, 1955 |
| 2,714,201 | Whitehead | July 26, 1955 |
| 2,723,362 | Gethmann | Nov. 8, 1955 |
| 2,724,021 | Goeppinger et al. | Nov. 15, 1955 |
| 2,751,433 | Linger | June 19, 1956 |
| 2,754,361 | Kleinschmidt | July 10, 1956 |
| 2,759,045 | Young | Aug. 14, 1956 |
| 2,759,046 | Berke | Aug. 14, 1956 |
| 2,770,674 | Brewster | Nov. 13, 1956 |
| 2,784,392 | Chaimowicz | Mar. 5, 1957 |
| 2,790,966 | Malbon | Apr. 30, 1957 |
| 2,806,757 | Cunningham | Sept. 17, 1957 |
| 2,814,030 | Miller et al. | Nov. 19, 1957 |
| 2,819,940 | Sorrells | Jan. 14, 1958 |
| 2,820,175 | Fubini | Jan. 14, 1958 |
| 2,837,692 | Denton | June 3, 1958 |
| 2,857,458 | Sziklai | Oct. 21, 1958 |